Dec. 1, 1925.　1,563,950
V. W. BALZER ET AL
CONTROL MEANS
Filed May 4, 1923　5 Sheets-Sheet 4
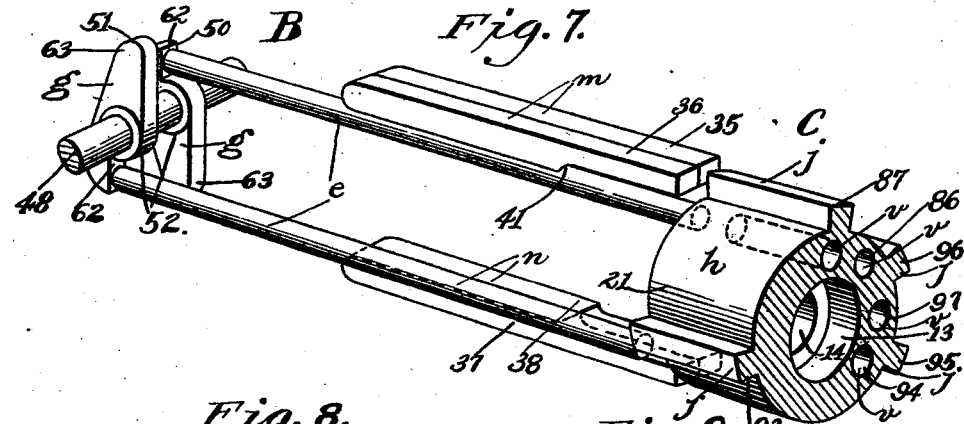
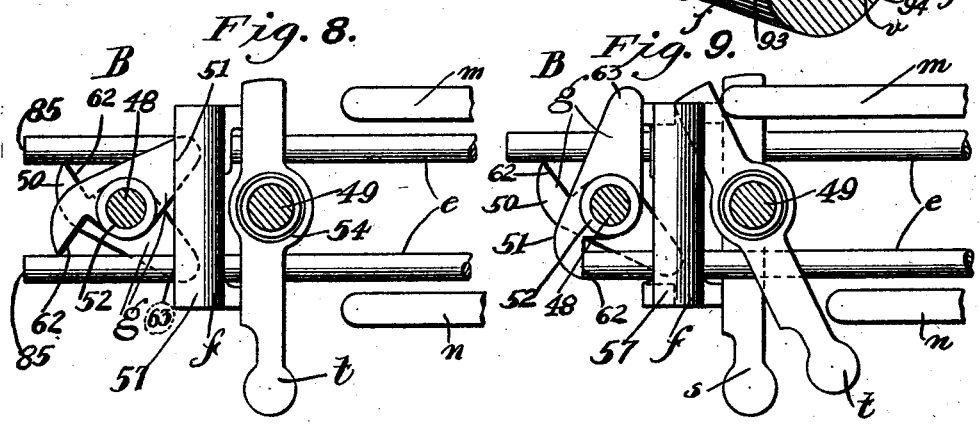
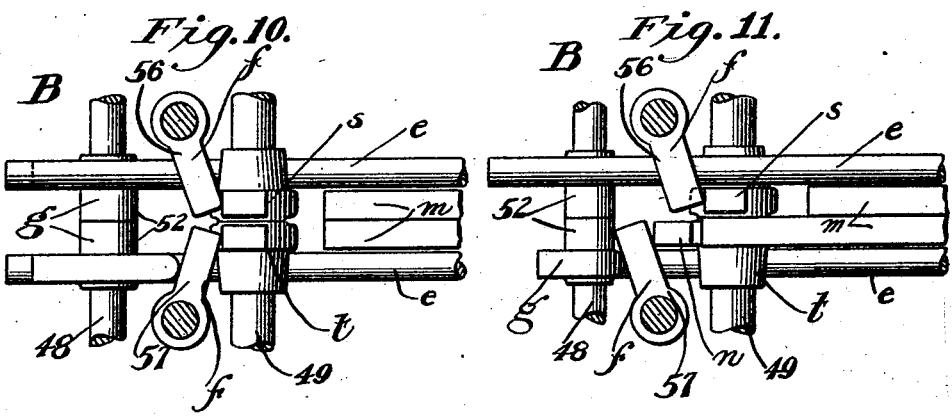
INVENTORS,
Vernon W. Balzer,
John McKnight Ballou;
BY
Blakeslee & Brown
ATTORNEYS.

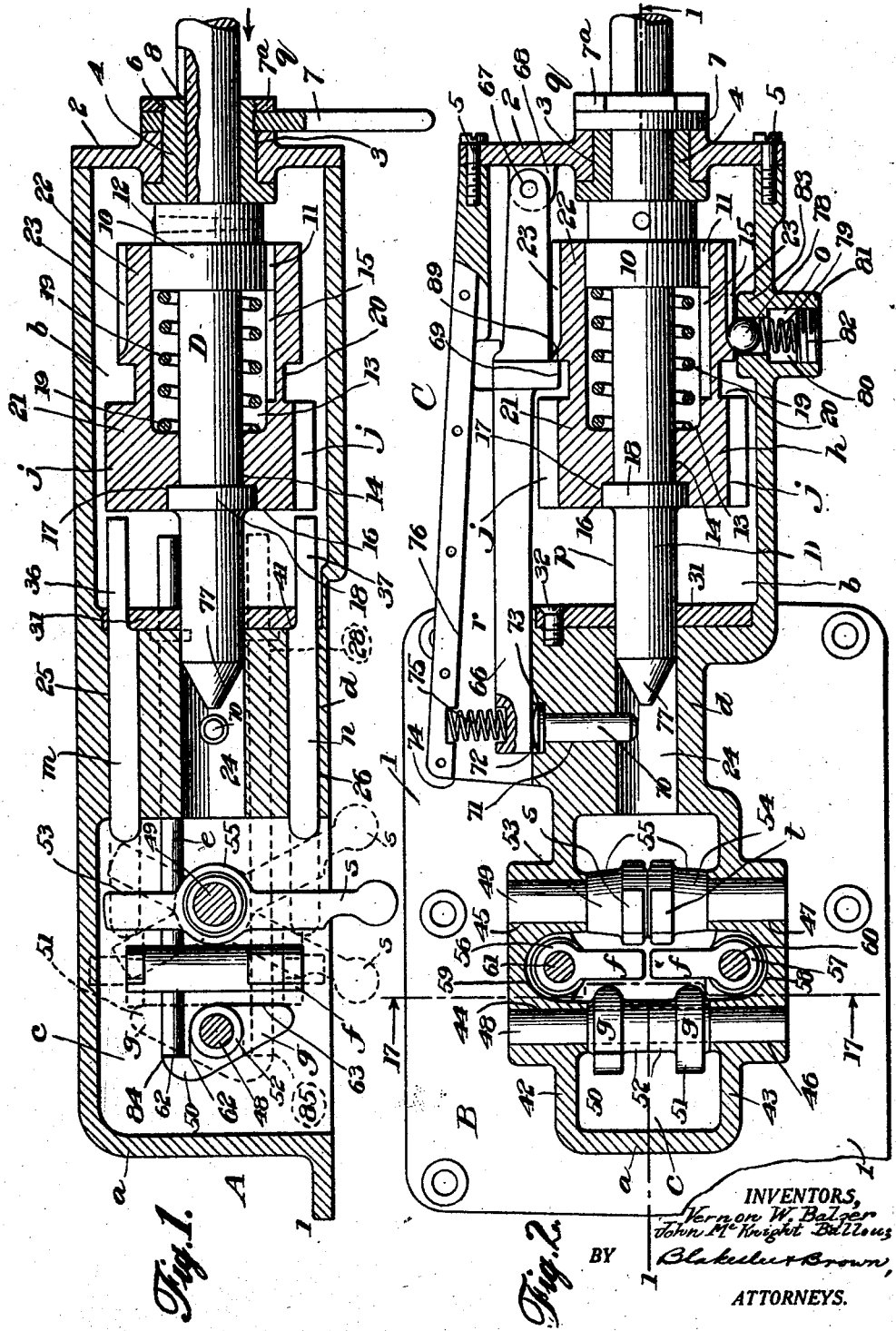

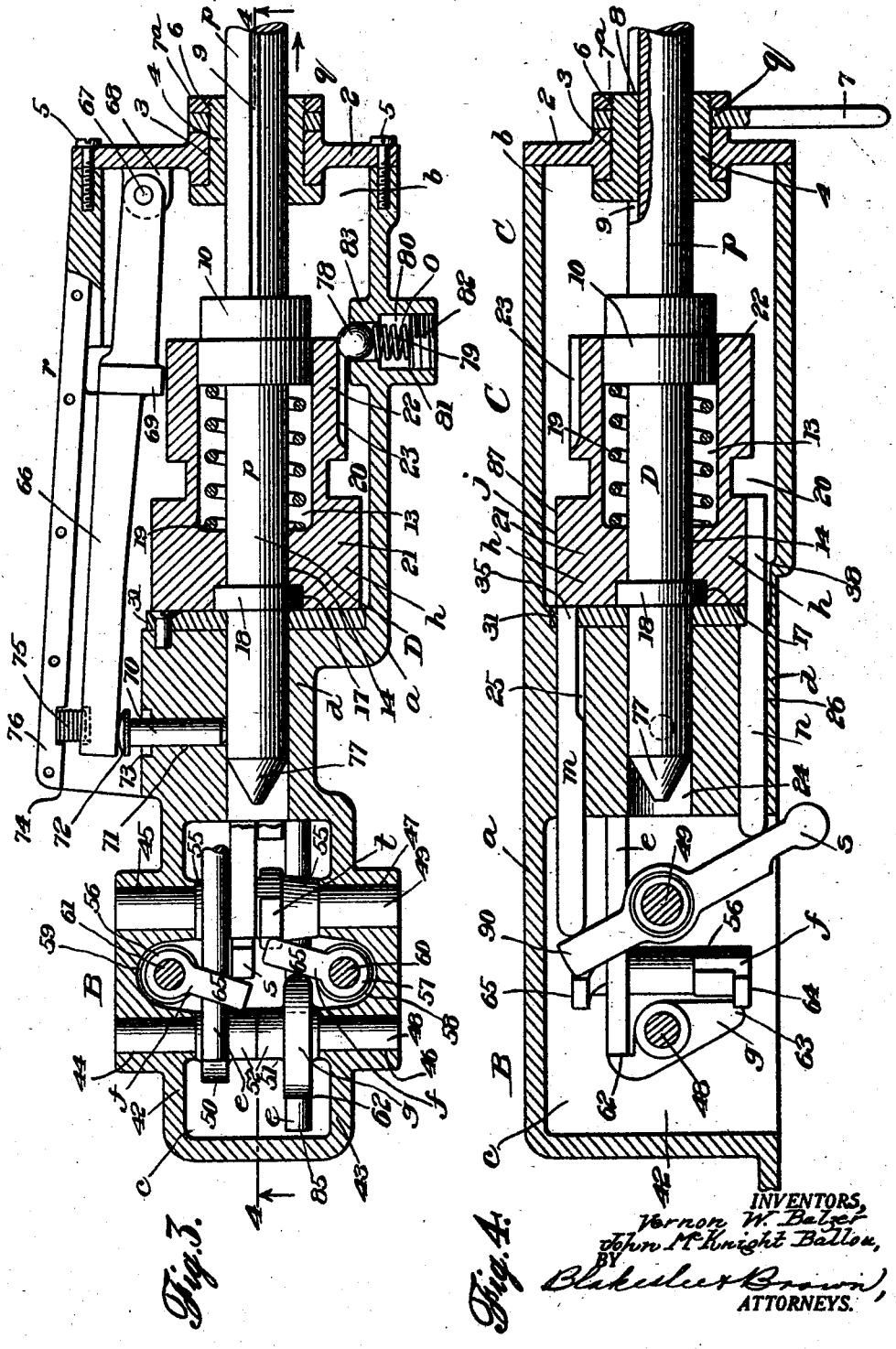

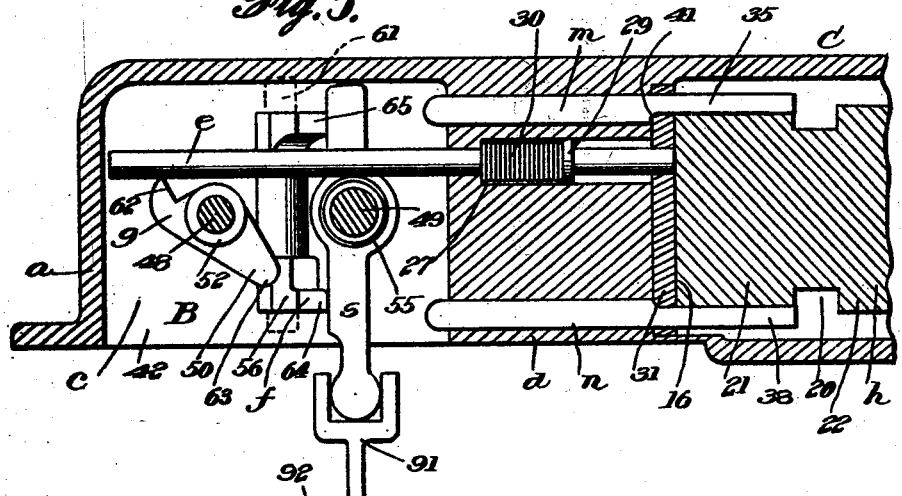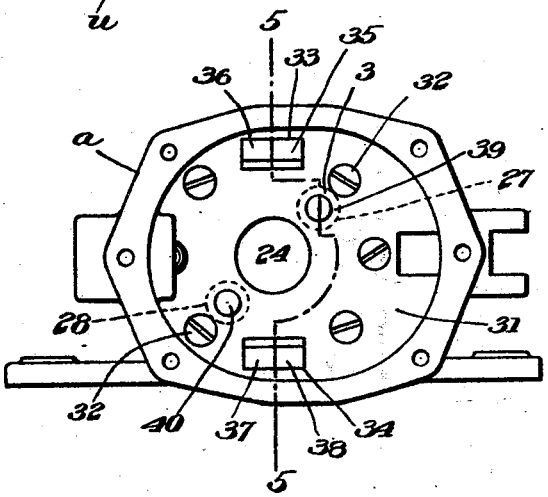

Patented Dec. 1, 1925.

1,563,950

UNITED STATES PATENT OFFICE.

VERNON W. BALZER AND JOHN McKNIGHT BALLOU, OF LOS ANGELES, CALIFORNIA, ASSIGNORS TO THOMAS COOLIDGE, OF LOS ANGELES, CALIFORNIA.

CONTROL MEANS.

Application filed May 4, 1923. Serial No. 636,733.

*To all whom it may concern:*

Be it known that we, VERNON W. BALZER and JOHN MCKNIGHT BALLOU, both citizens of the United States, residing at Los Angeles, in the county of Los Angeles and State of California, have jointly invented new and useful Improvements in Control Means, of which the following is a specification.

This invention relates to means for controlling movement of devices and the selection of said devices such as selecting certain gears to change the speed of rotation of said gears, or the selection of stepped pulley wheels for varying the traveling speed of the belts or for shifting the belt or belts from one step to another step on said pulleys, for the operation of switch members to vary the loading in electrical circuits and thus control the speed of rotation of motors or other devices capable of electrical control such as planers and the like.

The invention has for an object the provision of means which is simple of construction, fool-proof and positive in its operation and action.

In practicing the invention we may provide neutralizing means and selector means, said selector means including selector heads, selector rods to be operated by said heads, means for operating the selector termed a control member which co-acts with a selector ram, which ram operates certain of the selector rods, as well as neutralizing rods, certain of said neutralizing rods actuating a neutralizer gate through a suitable lever, and which neutralizer gate in turn operates a lever, the last named lever being adapted to directly control through a suitable fork or otherwise, changes in position of gears, pulleys or the like.

With the above and other objects in view, the invention consists in the novel and useful provision, formation, construction, association and relative arrangement of parts, members and features, all as shown in one embodiment in the accompanying drawings, described generally, and finally pointed out in claims.

In the drawings:

Figure 1 is a fragmentary longitudinal sectional view of the improved device, said view being taken on the line 1—1 of Figure 2;

Figure 2 is a fragmentary top plan view of the device shown in Figure 1, certain parts being in section;

Figure 3 is a view similar to Figure 2 and showing the position of certain members of the device operated;

Figure 4 is a fragmentary longitudinal sectional view of the device shown in Figure 3, and taken on the line 4—4 of Figure 3 and looking in the direction of the arrows;

Figure 5 is a fragmentary longitudinal sectional view of the device, and showing one of the neutralizing rods operating a neutralizer gate through the medium of a suitable lever and throwing a second lever into a neutral position, and taken on the line 5—5 of Figure 6;

Figure 6 is an end view of the device with the cover removed;

Figure 7 is a perspective view of certain of the operating parts of the device;

Figure 15:
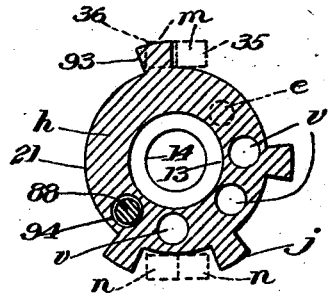
Figure 16:
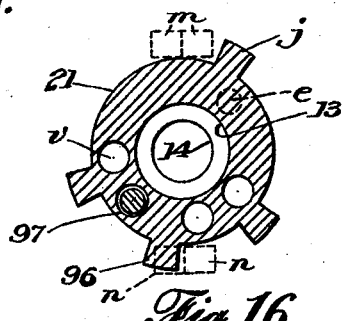
Figure 17:
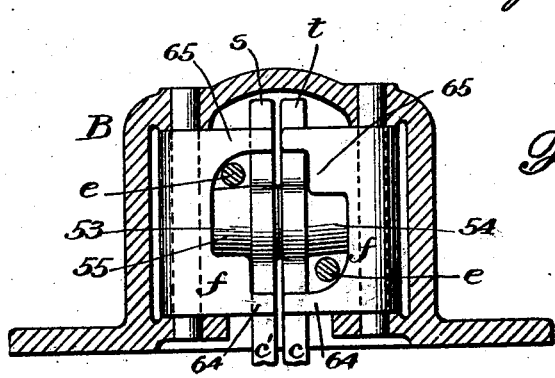

Figures 8 to 11 inclusive illustrate various operative positions of certain of the operative elements of the device;

Figures 12 to 16 inclusive illustrate various positions that may be assumed by the selector ram for operating selector rods through the medium of selector heads; and Figure 17 is a transverse sectional view of the casing and showing neutralizer gates, said view being taken on the line 17—17 of Figure 2 and looking in the direction of the appended arrows.

Corresponding parts in all the figures are designated by the same reference characters.

Referring with particularity to the drawings, the improved device is designated as an entirety and in the embodiment shown by A, and said device is provided with a casing *a* adapted to house and maintain both the neutralizing means designated generally by B, the selector means designated generally by C and control means D for the neutralizer means and selector means. The casing *a* in the showing is formed with two compartments as *b* and *c*, with a partition *d* between said compartments. A broad flat plate member *l* may be integrally formed with the casing whereby the device A as an entirety may be associated with and held to some object.

The neutralizer means B includes neutralizer rods *e*, neutralizer gates *f* and neutralizer levers *g*, and the selector means C includes a selector ram $h$, selector heads $j$ carried by the ram $h$ and selector rods $m$ and $n$, and selector indicator means $o$. The control means D includes a shaft $p$ and means $q$ for turning said shaft, and a trigger member $r$.

The neutralizer means in combination with the selector means and the control means cooperate to effect one or more levers of which in the showing there are two, as $s$ and $t$.

The levers $s$ and $t$ are the levers to be actuated, as stated, and said levers are in turn adapted to control movement of gears such as those shown for instance in Figure 5 at $u$. The said levers $s$ and $t$ may be actuated at the same time in any number of directions, or one of said levers may be held in what may be termed a neutral position; that is to say, a position such as shown in Figure 1 in full lines when the other lever is moved.

An end plate 2 is formed with an opening 3 and adapted to be passed through said opening is a bearing member 4 constituting a part of the means $q$. The end plate may be held to the casing by suitable means such as screws 5 and thereby close an end of the compartment $b$. The bearing member 4 is formed with screw threads at 6, and the means $q$ further includes a lever 7 which is carried upon the member 4 and held to said member by a nut $7^a$ screw-threaded upon the threads 6. The bearing member 4 is formed with a key 8 received in an axial spline 9 on the shaft $p$. It is thus evident that rocking the lever 7 will in turn rotate the shaft $p$. Carried on the shaft $p$ is a stepped collar 10 the first step of which is provided with a key 11 and the second step of which is provided with a transverse tapered bore adapted to align with a bore in the shaft $p$ whereby a pin 12 may be passed through said bores for locking the stepped collar 10 to the shaft $p$. The ram $h$ is annular in formation and formed with stepped bores 13 and 14, the bore 13 being of a diameter corresponding to the diameter of one of the collars 10, and there is likewise a longitudinal groove 15 opening within the bore 13 and within which groove the key 11 is received. The second bore 14 is aproximately of a diameter equal to the diameter of the shaft $p$. The head portion 16 of the ram $h$ is provided with a bore 17 concentric with the bore 14 but of greater diameter, and said bore is adapted to receive a flange 18 carried by the shaft $p$. From the description as given so far it will be evident that rotation of the shaft $p$ will likewise rotate the ram $h$, due to the fact that the key 11 by fitting within the key-way or groove 15 will give a locking relation between the shaft and the ram. Adapted to surround the shaft $p$ and within the bore 13 is a spring 19 which abuts against the flange included between the bores 13 and 14 and a face of the collar 10. The ram is provided with a peripheral groove 20 which serves to divide the ram into two zones, one of which as 21 carries the selector heads $j$, while the second portion 22 is formed with a series of spaced flutes 23. The ram is likewise formed with a series of longitudinal bores $v$ in the part 21 of said ram, and which bores may be termed selector bores.

The partition $d$ is provided with a bore 24 adapted to receive the shaft $p$ and said partition is further provided with two bores as shown at 25 and 26 within which are received the selector rods $m$ and $n$. The bores 24, 25 and 26 extend between the chambers or compartments $b$ and $c$. The partition is further provided with two stepped bores which extend transversely between the chambers $b$ and $c$ as shown at 27 and 28. One of the bores of each stepped portion 27 and 28 is of greater diameter than the other bore, and each rod $e$ carries a collar 29, there being contractile members 30 within the bore and surrounding its respective rod $e$ and interposed between the flange separating the large and small bore and the collar 29, whereby the rods $e$ are at all times normally actuated in one direction. A plate member 31 is adapted to be attached to a face of the partition $d$, as by means of screws 32, and said plate is provided with bores 33 and 34 through which reduced ends 35, 36, 37 and 38 of the selector rods $m$ and $n$ may be passed. The plate is likewise provided with two bores 39 and 40 for the neutralizer rods $e$. It will be understood that these bores in the plate are formed so as to be in alignment with the respective bores in the partition $d$. However, the bores in the plate 31 for the selector rods accommodate only the reduced ends of said rods so as to restrict movement of the selector rods in one direction when the shoulders 41 between the reduced ends and the main body of the rods contact with the plate. It is obvious that the plate 31 would stop movement of the neutralizer rods when the collars 29 contact with said plate.

Within the chamber $c$ are the gates $f$ and levers $g$, as well as the main levers $s$ and $t$. Side walls 42 and 43 forming in part said chamber $c$ are provided with journal members 44, 45, 46 and 47. The journal portions 44 and 46 are in alignment, as are the journal portions 45 and 47, and shafts 48 and 49 are carried in the journal portions of the sides. The shaft 48 carries the levers $g$ of which two are provided, as shown at 50 and 51, each lever having a hub portion 52, said hub portions abutting, and likewise abutting with the hub portion of the journal portions of the sides so as to hold them in close working relation and yet free enough to allow independent action of each lever. The shaft 49 loosely carries thereon the levers s and t, as shown at 53 and 54, and each lever is provided with a hub portion 55 which is adapted to be in abutting relation and between the journal portions of the side walls, whereby they are held against side movement. Interposed in the space between the levers g, s and t, are the gates f of which two are provided, as shown at 56 and 57. The sides 42 and 43 at the enlarged portions thereof are chambered as shown at 58 and 59 so as to receive the bearing members of said gates, and pins or shafts 60 and 61 are adapted to maintain said gates in position, and said pins or shafts are approximately at right angles to the shafts 48 and 49; in other words, in such a position as to permit a limited swinging movement of the said gates between the levers g, s and t. Each lever g is provided with a notched end 62 and one of the neutralizer rods d is adapted to contact with a portion of said notched end and move said lever so that the opposite end portion, as 63 of said lever will contact with one of the gates f and move same about its pin or shaft, the gate in turn contacting upon movement with one of the levers s or t. In this connection it will be seen upon reference to certain of the figures, namely, Figs. 4 and 17, that each gate is provided with fingers 64 and 65 spaced from each other so as to permit the neutralizer rods to pass between said fingers for contact at times with the levers g. The gates are so arranged that the fingers of one gate will not contact with both levers s and t, but there will be a gate for each lever. The trigger r includes a lever 66 pivoted as at 67 to a stud 68 carried by the end plate 2, said lever being provided with a notch or projection 69 adapted to be received within the peripheral groove 20 of the ram h when the said ram is in one position. The free end of the lever is adapted to contact with a plunger or pin 70, which pin is received in a transverse bore 71 in the partition d, which bore 71 communicates with the bore 24. The pin 70 is provided with a head 72 and the partition d is provided with an annular bore 73 adapted to receive said head. The casing a is formed, as shown at 74 so as to accommodate movement of the lever 66, as shown in Figure 3. A spring 75 is interposed between a side 76 of the casing and the lever so as to at all times force the lever inwardly and tend to force the pin 70 within the bore 71 so that an end thereof projects within the bore 24. In this connection it is to be noted that the shaft p is provided with a beveled head 77 which when said shaft is forced through the bore 24 will tend to push the pin 70 upwardly within the bore 71 and move the lever so that the projection 60 will leave the peripheral groove 20 of the ram.

The selector indicator means o includes a ball member 78 which is at all times forced against the periphery of the ram h and particularly the portion 22 of said ram, by means of a coil spring 79. Said coil spring is received within a chamber 80 of an annular housing 81 formed on the casing a, the inner surface of said annular member 81 being screw-threaded for reception of an internal nut 82 whereby the spring may be varied as to its pressure against the ball 78, said ball in turn being carried within a reduced bore in an enlargement 83 of the casing a. This ball 78 acts both as a selector indicating means and as a means for locking the ram against turning when the same is received within certain of the flutes, all as will more fully appear in the statement of the operation.

Figure 12:
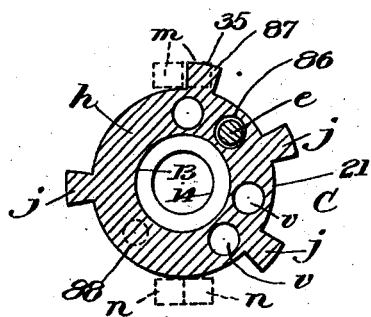
Figure 13:
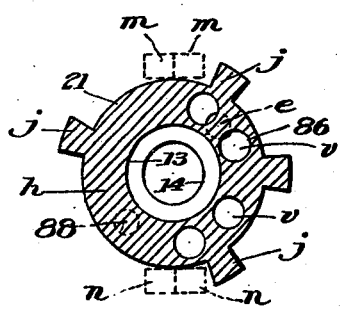

The operation of the device A is as follows:

First, assume the parts in the relation shown in Figures 1 and 2 in the solid lines and in which figures the ram h with the shaft p are in what is termed retracted position within the chamber b being held in such position by the notch 69 of the lever 66 entering the peripheral groove 20 of said ram. It will likewise be observed that the stepped collar 10 is adjacent the end plate 2 and in particular the member 4 constituting a part of the means q. Furthermore, in said position the spring 19 is in expanded position as shown. If two levers s and t are provided, as shown in the said figures the said levers will be in upright position. Likewise assume that the selector rods m and n are in the position shown in Figure 1 with their shoulders 41 abutting against the plate 31. The neutralizer rods e under influence of the springs 30 are forced in part into the chamber b and are limited in such movement by the collars 29 contacting with the plate 31. When in this position ends 84 and 85 of the rods e may contact with the noses 62 of the neutralizer levers g. We thus have all the parts in what may be called an inoperative position or a neutral position. When the parts are in the position illustrated in Figures 1 and 2 it is possible upon moving the handle 7 to rotate the shaft p and thereby rotate the ram h, as the ball 78 being at the most shallow portion of one of the flutes 23, may ride upon the periphery of said ram h. Assume that we move the handle 7 to what may be termed position one, as shown in Figure 12. (The position for the parts shown in Figures 1 and 2 would be similar to that shown in Figure 13.) When the ram has been turned from the position shown in Figure 13 to the position shown in Figure 12 the ball member 78 will contact with a flute and thereby give an indication that a second position is assumed by said ram. If we call this position 1, as shown in Figure 12, the neutralizer rod openings $v$, of which there are a number corresponding to the number of selector heads $j$, are brought into such a position that one of the neutralizer rods may enter within one of said openings. In the position of the ram shown in Figure 12 the upper neutralizer rod $e$ may enter the neutralizer opening $v$ as shown at 86, and one of the selector rods $m$, namely, the one shown at 35, will be in alignment with one of the selector heads $j$ shown at 87. The other selector rods are out of alignment with the heads $j$. The lower neutralizer rod $e$ as indicated by the dotted line in Figure 12 at 88, will contact with the ram $h$ when the ram is moved. If we push the shaft $p$ inwardly in the direction of the arrow at the right-hand end of Figure 1, the beveled or cone-shaped nose 77 of said shaft $p$ will contact with the plunger or pin 70 and lift the same. However, it is evident that the shaft will have to move a considerable distance inwardly before the plunger 70 is lifted high enough to cause the notch 69 carried by the lever 66 to be entirely lifted from the peripheral groove 20 of the ram so that the notch or projection 69 may escape over the wall 89 of the ram. By the ram not moving and the shaft moving inwardly, the spring 19 will be compressed, and when the plunger 70 has been raised a sufficient distance to lift the projection 69 from contact with the wall 89, the spring will expand suddenly and force the ram first against the lower neutralizer rod $e$ moving it inwardly then followed by movement of the selector rod $m$ shown at 35, when the selector head $j$ shown at 87 contacts therewith. The other selector rods will slide over the periphery of the ram without contacting with any of the heads $j$, as has been stated, and the lower neutralizer rod $e$ will enter the opening $v$ at 86. This resultant movement of the parts is shown in Figures 3 and 4, in which it will be seen that the end 85 of the lower neutralizer rod $e$ has contacted with the nose 62 of the lever $g$ shown at 51, and rotated said lever in such a manner that the opposite end of the same has contacted with the gate $f$ shown at 57 and forced the same against the lever $t$. This movement will cause the lever $t$ to assume an upright position like that shown in the full lines of Figure 1 for the lever $s$, inasmuch as both fingers 64 and 65 of the gate contact with the lever $t$ on opposite sides of the pivot point of said lever. The head $j$ shown at 87, as stated, contacts with the selector rod $m$ shown at 35 and forces the same inwardly, and this inward movement of the selector rod causes the end of the same to contact with the lever $s$ shown at 53, and causes the same to pivot about its shaft 49 and into the position shown in Figure 4 in which it is seen that the upper end as 90 is moved anti-clockwise about the shaft 49. From the statement of the operation, as just given it is evident that one lever $t$ is maintained in an upright position or what is termed a neutral position, when the other lever is to be moved to a given position, and further, attention is directed to the fact that the neutralizer rods $e$ are of a length sufficient to cause them to contact when in the position shown in Figures 1 and 2, with the neutralizer levers $g$, while the selector rods $m$ and $n$ are out of contact with the levers $s$ and $t$. In other words, there is a differential movement in which one of the levers $g$, depending upon which one is to be moved first, throws one of the levers, for instance $t$, into a given position before a selector rod contacts with the lever $s$ to be moved; that is, one of the levers $s$ or $t$ always moves to neutral position before the other lever assumes a position other than neutral. If the shaft $p$ is now pulled outwardly in the direction of the arrow at the right-hand side of Figure 3, the lever 66 will slide over the periphery of the part 22 of the ram $h$ until the projection 69 enters the notch or groove 20 and holds the ram in retracted position. The neutralizer rods under action of the spring 30 will move inwardly so that they again assume the position shown in Figure 1. However, the selector rod $m$ shown at 35 will remain in the position shown in Figure 3, as will likewise the gates $f$ and the lever $s$ which has been moved. This will be particularly true for the lever $s$ providing it has moved a fork member 91, as shown in Figure 5, to a given position, whereby a gear 92 is caused to mesh with a second gear. If we rotate the shaft $p$ through the medium of the handle 7 back to the position termed neutral in which the ram would appear as shown in Figure 13, then push the shaft $p$ inwardly so that the same compresses the spring 19, due to the fact that the ram cannot move until the trigger releases the same, the ram will upon such release move forward under impetus given the same by the stored up energy in the compressed spring, and it will be seen upon reference to Figure 13 that the upper and lower neutralizer rods $e$ will contact with the end 16 of said ram; said neutralizer rods not entering any of the openings or bores $v$, with the consequence that said rods are moved inwardly forcing the levers $g$ to pivot about the shaft 48 with the opposite ends of said levers contacting with the gates $f$ swinging said gates inwardly so that the fingers of the same contact with the levers $s$ and $t$ and thereby moving said levers into an upright or what has been defined as neutral position. The neutral position and the action just described is shown in Figures 8 and 10, and it will be seen that the said neutralizer rods *e* ride over the noses 62 of the levers *g*, and lock the opposite ends of said levers against the gates *f* and the levers *s* and *t*. For a position we might term position 3 and which position is illustrated in Figures 15, 9, and 11, it will be seen that the selector rod *m* shown at 36 is moved by a selector head *j* shown at 93, the remaining selector rods *m* and *n* not contacting with the other heads *j*; likewise the upper neutralizer rod *e* will not enter one of the bores *v*, but will contact with the end 16 of the ram *h*, while the lower neutralizer rod *e* will enter one of the bores *v* shown at 94. The action will be just contrary to that described for position 1; that is, the lever *s* will be maintained in neutral position while the lever *t* is moved inwardly by the selector rod *m* shown at 36.

Figure 14:
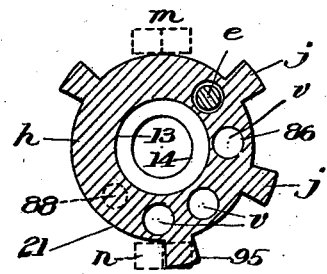

Reference to Figure 14 will illustrate what may be termed position 2, and in which the ram has been moved so that the selector rods *m* are out of contact with the heads *j*, while one of the selector rods *n*, shown at 34, will contact with one of the heads *j* shown at 95. In this case the action will be identical with the action described for position 1, with the exception that the rods *m* are not moved, but one of the rods *n* is moved, causing the lever *s* to be moved or pivoted clockwise about its shaft 49, the upper neutralizer rod *e* not acting, since it will enter one of the bores *v*, the lower neutralizer rod contacting with the head of the ram and hence moving the lever *g* shown at 51 in Figure 1 so that the opposite end of the same will move the gate into such a position as to lock the lever *t* in neutral position.

In Figure 16 we have position 4, in which the selector rods *m* are not acted upon by any of the heads *j*, but one of the selector rods *n* shown at 37 will be moved by one of the heads *j* shown at 96 contacting with the same. In this case the lower neutralizer rod *e* will enter one of the openings *v*, as shown at 97, and the upper neutralizer rod *e* will contact with the head of the ram, and this movement will lock the lever *s* in neutral position and move the lever *t* clockwise. It is thus seen from the arrangement shown that various positions may be assumed by the levers *s* and *t* and that the same may be held in what is termed neutral position, or rocked back and forth about the shaft 49 with one of said levers at all times maintained in neutral position when the other lever is moved.

It is obvious that many combinations of levers may be utilized to accomplish various objects, such as throwing the switches, as stated in the preamble, but we do not wish to be limited to the precise arrangement shown or the precise number of parts shown, as there may be any multiple of said parts or any number of heads *j* or openings *v*, or for that matter, neutralizer rods and selector rods.

A device of this character is practically fool-proof in its operation, for the reason that one lever, say *s*, as shown in Figure 5, is securely locked in the position termed neutral, by the lever *g* being thrown so as to move the gate member *f* against said lever *s*, said lever *g* being locked in said thrown position when the upper neutralizer rod *e* passes over the nose 62 and beyond said nose. It is obvious that the lever *g* could not swing back, as it is locked between said neutralizer rod *e* and the gate. If the neutralizer should fail to function from any cause whatsoever, it is obvious that due to the formation and relation of the parts, the remaining members of the device would fail to function.

It is obvious that various changes and modifications may be made in practicing the invention, in departure from the particular showing, and that said variations and modifications may be made within a fair interpretation of the invention as set forth in the foregoing statement and the appended claims.

Having thus disclosed our invention, we claim and desired to secure by Letters Patent:

1. In a device of the character disclosed, a shaft, a ram slidable thereon, a resilient connection between said ram and shaft, and a trigger member for engagement with said ram and adapted to be released from said ram upon movement of the shaft in one direction to permit movement of the ram independent of the shaft.

2. In a device of the character disclosed, a shaft, a ram slidable thereon, a resilient connection between said ram and shaft, a trigger member for engagement with said ram and adapted to be released from said ram upon movement of the shaft in one direction to permit movement of the ram independent of the shaft; a rod, said ram being formed with a bore, and said rod, dependent upon position of the ram being adapted to be struck by, or received in the bore of, said ram when released.

3. In a device of the character disclosed, including neutralizer means, said neutralizer means comprising a swinging gate and means for moving said gate; a lever, said lever being adapted to be moved by said gate into a given position.

4. In a device of the character disclosed, including neutralizer means, said neutralizer means comprising a swinging gate and means for moving said gate; a lever, said lever being adapted to be moved by said gate into a given position; in combination with selector means for moving said lever.

5. In a device of the character disclosed, including neutralizer means; said neutralizer means comprising two levers, a shaft upon which said levers are mounted, two gate members, means for independently hinging the gates adjacent the levers, and means for independently moving said levers.

6. In a device of the character disclosed, including neutralizer means; said neutralizer means comprising two levers, two gate members, a second pair of levers, said gates being interposed between the second pair of levers and the first named levers, and means for independently moving one of said first levers to move the gate member into contact with one of the second pair of levers.

7. In a device of the character disclosed, including neutralizer means; said neutralizer means comprising two levers, two gate members, and means for independently moving said levers to move the gate members; a second pair of levers, said gates being interposed between the second pair of levers and the first named levers and adapted to contact with certain of the first and second levers when in a given position; in combination with selector means adapted to actuate one of said second pair of levers.

8. In a device of the character disclosed, including neutralizer means, said neutralizer means comprising two levers, a shaft upon which said levers are mounted, two gate members to be moved by the levers, and means for independently moving said levers; a second pair of lever members, a shaft upon which said levers are mounted; said gates being interposed between the last named levers and the levers for moving said gates; in combination with selector means adapted to actuate one or the other of said second pair of levers; said selector means including means for actuating one of said second pair of levers at a time and means to move the first lever to move a gate member into position to maintain the other of said second levers in a given position.

9. In a device of the character disclosed, selector means comprising a ram, there being spaced flutes upon the periphery of said ram and means receivable in certain of the flutes for maintaining said ram against rotation when the ram is in one position, said flutes being formed to release the means from the flutes of said ram when the ram is in a second position.

10. In a device of the character disclosed, lever members, neutralizer means for each lever member and selector means for moving certain of the levers into a given position while the neutralizer means holds other of said levers against movement; said selector means including selector rods and a ram provided on its periphery with selector heads, said selector heads actuating certain of the selector rods when the ram is moved.

11. In a device of the character disclosed, including a series of levers to be moved to different positions; selector means for actuating said levers and neutralizer means for holding certain of said levers immovable during movement of certain of the levers by the selector means; said selector means including a ram, and rods for moving said levers upon the ram contacting therewith; there being means for causing such ram to suddenly strike the rods.

12. In a device of the character disclosed, including a series of levers to be moved to different positions; selector means for actuating said levers and neutralizer means for holding certain of said levers immovable during movement of certain of the levers by the selector means; said selector means including a ram, and rods for moving said levers upon the ram contacting therewith, means likewise being provided for causing such ram to suddenly strike the rods; said neutralizer means including neutralizer rods adapted to be moved by said ram to maintain certain of the levers immovable.

13. In a device of the character disclosed, including a series of levers to be moved to different positions; selector means for actuating said levers and neutralizer means for holding certain of said levers immovable during movement of certain of the levers by the selector means; said selector means including a ram, and rods for moving said levers upon the ram contacting therewith, said neutralizer means including neutralizer rods adapted to be moved by said ram to maintain certain of the levers immovable; said ram being provided with a series of bores, and certain of the neutralizer rods entering certain of said bores to permit the selector rods to move certain of the levers.

14. In a device of the character disclosed, comprising a ram, means for holding such ram against movement, two lever members, a selector rod and a neutralizer rod for each lever member, and means carried by the ram for actuating one or the other of said selector rods when the first means is released.

15. In a device of the character disclosed, comprising a ram, means for holding such ram inoperative, two lever members, a selector rod and a neutralizer rod for each lever member, and means carried by the ram for actuating one or the other of said selector rods; and means for suddenly moving the ram when the first means is released to actuate one selector rod to move one of the levers and to actuate a neutralizer rod to move the other lever into a given position, the other selector rod and neutralizer rod remaining inoperative.

16. In a device of the character disclosed, comprising a ram, means for holding such ram against movement, two lever members, a selector rod and a neutralizer rod for each lever member, and means carried by the ram for actuating one or the other of said selector rods; and means for suddenly moving the ram when the first means is released from the ram to actuate one selector rod to move one of the levers, to actuate a neutralizer rod to move the other lever into a given position, the other selector rod and neutralizer rod remaining inoperative; said neutralizer rods being provided with means for actuating the same in one direction.

In testimony whereof, we have signed our names to this specification.

VERNON W. BALZER.
JOHN McKNIGHT BALLOU.